(12) United States Patent
Kikuchi et al.

(10) Patent No.: US 9,452,936 B2
(45) Date of Patent: Sep. 27, 2016

(54) ZEOLITE STRUCTURE AND MANUFACTURING METHOD THEREOF

(71) Applicant: NGK Insulators, Ltd., Nagoya (JP)

(72) Inventors: Yoshio Kikuchi, Nagoya (JP); Haruo Otsuka, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 262 days.

(21) Appl. No.: 14/155,443

(22) Filed: Jan. 15, 2014

(65) Prior Publication Data

US 2014/0124992 A1    May 8, 2014

Related U.S. Application Data

(62) Division of application No. 13/050,381, filed on Mar. 17, 2011, now Pat. No. 8,716,162.

(30) Foreign Application Priority Data

Mar. 25, 2010   (JP) .................. 2010-070095

(51) Int. Cl.
  *C01B 39/04*   (2006.01)
  *B01D 71/02*   (2006.01)
  *B01J 29/06*   (2006.01)
  *B01J 35/04*   (2006.01)
  *B01D 53/94*   (2006.01)

(52) U.S. Cl.
  CPC ............. *C01B 39/04* (2013.01); *B01D 71/028* (2013.01); *B01J 29/06* (2013.01); *B01J 35/04* (2013.01); *B01D 53/9413* (2013.01); *B01D 2253/108* (2013.01); *B01D 2255/20738* (2013.01); *B01D 2255/20761* (2013.01); *B01D 2255/50* (2013.01); *B01D 2255/502* (2013.01); *B01D 2255/912* (2013.01); *B01D 2255/92* (2013.01)

(58) Field of Classification Search
  None
  See application file for complete search history.

(56) References Cited

U.S. PATENT DOCUMENTS

2003/0138389 A1   7/2003   Klug et al.
2003/0187312 A1   10/2003  Chang et al.
(Continued)

FOREIGN PATENT DOCUMENTS

EP   2 123 614 A2   11/2009
EP   2 130 591 A2   12/2009
(Continued)

OTHER PUBLICATIONS

U.S. Appl. No. 13/052,352, filed Mar. 21, 2010, Kikuchi et al.
(Continued)

*Primary Examiner* — Colin W Slifka
(74) *Attorney, Agent, or Firm* — Burr & Brown, PLLC

(57) ABSTRACT

The zeolite structure is a porous zeolite structure constituted of a formed article obtained by extruding a zeolite raw material containing zeolite particles and an inorganic binding material including at least basic aluminum chloride, a ratio P1 ($P1=V2/V1 \times 100$) of a volume V2 of the inorganic binding material in the zeolite structure with respect to a volume V1 of the zeolite structure is from 10 to 50 vol %, and a relation of equation (1) is satisfied:

$$P2/P1 \leq 1.0 \qquad (1),$$

in which P1 is the ratio of the volume V2 of the inorganic binding material in the zeolite structure with respect to the volume V1 of the zeolite structure and P2 ($P2=Vb/Va \times 100$) is a ratio of volumes Vb of pores having pore diameters of 0.003 to 0.03 μm with respect to the whole pore volume Va of the zeolite structure.

1 Claim, 2 Drawing Sheets

(56) References Cited

U.S. PATENT DOCUMENTS

2007/0259770 A1 11/2007 Hofmann et al.
2009/0291253 A1 11/2009 Ohno et al.
2009/0291839 A1 11/2009 Kunieda et al.

FOREIGN PATENT DOCUMENTS

| JP | 3272446 | B2 | 4/2002 |
| JP | 2007-296521 | A1 | 11/2007 |
| JP | 2008-169104 | A1 | 7/2008 |
| JP | 2009-000657 | A1 | 1/2009 |
| WO | 2009/141878 | A1 | 11/2009 |

OTHER PUBLICATIONS

U.S. Appl. No. 13/052,390, filed Mar. 21, 2010, Kikuchi et al.
U.S. Appl. No. 13/069,753, filed Mar. 23, 2010, Kikuchi et al.
U.S. Appl. No. 13/050,302, filed Mar. 17, 2010, Kikuchi et al.

ZEOLITE STRUCTURE AND MANUFACTURING METHOD THEREOF

CROSS-REFERENCE TO RELATED APPLICATION

This application is a divisional of U.S. patent application Ser. No. 13/050,381, filed Mar. 17, 2011, the entirety of which is incorporated herein by reference, and claims the benefit under 35 USC §119(a)-(d) of Japanese Patent Application No. 2010-070095 filed on Mar. 25, 2010.

BACKGROUND OF THE INVENTION

1. Field of the Invention

The present invention relates to a zeolite structure, and a manufacturing method of the zeolite structure. More particularly, it relates to a zeolite structure having an excellent mechanical strength, and a manufacturing method of the zeolite structure.

2. Description of the Related Art

It is known that zeolite is a type of silicate having a mesh crystal structure provided with fine pores having a uniform diameter, there are present various chemical compositions represented by the general formula: $W_m Z_n O_{2n} \cdot sH_2O$ (W: sodium, potassium, calcium or the like, Z: silicon, aluminum or the like, and s takes various values), and there are present many kinds (types) of crystal structures having different pore shapes. Zeolite has an inherent adsorption ability, catalyst performance, solid acid characteristics, ion exchange ability and the like based on the respective chemical compositions or crystal structures, and is utilized in various use applications such as an adsorbing material, a catalyst, a catalyst carrier, a gas separation film and an ion exchanger (e.g., see Patent Documents 1 to 3).

For example, MFI-type zeolite (also referred to as "ZSM-5 type zeolite") is provided with pores each having a size of about 0.5 nm by oxygen ten-membered rings among crystals, and is utilized in a use application such as an adsorbing material for adsorbing nitrogen oxides (NOx), hydrocarbons (HC) or the like in a car exhaust gas, or a gas separation film for selectively separating only p-xylene from a xylene isomer. Moreover, Deca-Dodecasil 3R (DDR) type zeolite is zeolite provided with pores of about 0.44×0.36 nm by oxygen eight-membered rings among crystals, and is utilized in a use application such as a gas separation film for selectively separating/removing only carbon dioxide from a natural gas or a biological gas to improve purity of methane which is useful as a fuel.

Moreover, for the purpose of purifying NOx or the like contained in an exhaust gas discharged from an engine for a car, an engine for a construction machine, an industrial stational engine, a burning apparatus or the like or adsorbing hydrocarbons or the like contained in the exhaust gas, as a ceramic carrier (a honeycomb structure) made of cordierite or the like and having a honeycomb shape, there is used a catalyst material onto which zeolite subjected to an ion exchange treatment is loaded.

When zeolite is loaded onto the above ceramic carrier made of cordierite or the like, cordierite or the like does not exert a function of removing NOx, a function of adsorbing hydrocarbons or the like. Therefore, when cordierite or the like is present, a pressure loss during passing of the exhaust gas increases.

To solve this problem, there is suggested a method of forming and firing a forming raw material containing zeolite subjected to an ion exchange treatment between cations of zeolite and metal ions, to form a honeycomb structure itself (e.g., see Patent Documents 4 and 5).

[Patent Document 1] JP-A-2007-296521
[Patent Document 2] Japanese Patent No. 3272446
[Patent Document 3] JP-A-2009-000657
[Patent Document 4] JP-A-2008-169104
[Patent Document 5] WO2009/141878A1

SUMMARY OF THE INVENTION

However, such a conventional zeolite structure has a problem that a mechanical strength such as a bending strength is low. In particular, when the honeycomb structure itself is made of zeolite and is installed and used in an exhaust system of a car, the conventional zeolite structure has a problem such as breakdown or deformation due to vibration of the car or the like.

Moreover, even in the conventional zeolite structure, when a large amount of binding material which binds zeolite particles is contained, the mechanical strength of the structure can be improved to a certain degree. However, the ratio of zeolite included in the zeolite structure lowers, which causes a problem that a purification performance deteriorates.

The present invention has been developed in view of the above problem, and an object thereof is to provide a zeolite structure having an excellent mechanical strength and a manufacturing method of the zeolite structure.

The present inventor has intensely performed investigation to solve the above problem of a conventional technology, and has considered that as an inorganic binding material to bind zeolite particles which become aggregates, a predetermined amount of the binding material containing at least basic aluminum chloride is used to form a dense binding portion by the inorganic binding material, thereby obtaining a zeolite structure satisfying a relation of $P2/P1 \leq 1$, in which P2 is a ratio of volumes of pores having pore diameters of 0.003 to 0.03 μm with respect to the whole pore volume and P1 is a ratio of a volume of an inorganic binding material with respect to a volume of the zeolite structure, to solve the above problem, thereby completing the present invention. Specifically, according to the present invention, the zeolite structure and a manufacturing method of the zeolite structure are provided as follows.

[1] A zeolite structure comprising a formed article obtained by extruding a zeolite raw material containing zeolite particles and an inorganic binding material including at least basic aluminum chloride and being porous, wherein a ratio P1 (P1=V2/V1×100) of a volume V2 of the inorganic binding material in the zeolite structure with respect to a volume V1 of the zeolite structure is from 10 to 50 vol %, and a relation of equation (1) is satisfied:

$$P2/P1 \leq 1.0 \qquad (1),$$

in which P1 is the ratio of the volume V2 of the inorganic binding material in the zeolite structure with respect to the volume V1 of the zeolite structure and P2 (P2 =Vb/Va×100) is a ratio of volumes Vb of pores having pore diameters of 0.003 to 0.03 μm with respect to the whole pore volume Va of the zeolite structure.

[2] The zeolite structure according to the above [1], wherein the inorganic binding material contained in the zeolite raw material includes basic aluminum chloride having an amount corresponding to 10 to 30 mass % in terms of a solid content with respect to 100 mass % of the zeolite particles.

[3] The zeolite structure according to the above [1] or [2], wherein the inorganic binding material contained in the zeolite raw material further includes at least one type selected from the group consisting of alumina sol, silica sol, titania sol, zirconia sol, ceria sol, boehmite, montmorillonite, hydrotalcite, hydraulic alumina, silicon resin, and water glass.

[4] The zeolite structure according to any one of the above [1] to [3], wherein zeolite particles of at least a part of the zeolite particles are particles made of at least one type of zeolite selected from the group consisting of ZSM-5 type zeolite, β-type zeolite, Y-type zeolite, mordenite type zeolite and ferrierite type zeolite.

[5] The zeolite structure according to any one of the above [1] to [4], wherein zeolite particles of at least a part of the zeolite particles are particles made of zeolite subjected to ion exchange between cations of zeolite and ions of at least one metal selected from the group consisting of copper, iron, nickel, zinc, manganese, cobalt, silver, palladium, indium, cerium, gallium, titanium and vanadium.

[6] The zeolite structure according to any one of the above [1] to [5], which is formed in a honeycomb shape including partition walls disposed to form a plurality of cells which become through channels of a fluid and which extend from one end face to the other end face.

[7] A manufacturing method of a zeolite structure, comprising: a step of mixing zeolite particles, an inorganic binding material which binds the zeolite particles to one another, and an organic binder to prepare a zeolite raw material; a step of extruding the obtained zeolite raw material to obtain a formed zeolite article; and a step of firing the obtained formed zeolite article to prepare the zeolite structure, wherein the step of preparing the zeolite raw material includes the steps of adding the inorganic binding material including basic aluminum chloride having an amount corresponding to 10 to 30 mass % in terms of a solid content to 100 mass % of the zeolite particles so that a ratio of a volume of the inorganic binding material included in the zeolite structure with respect to a volume of the zeolite structure obtained by firing the formed zeolite article is from 10 to 50 vol %.

In a zeolite structure of the present invention, as an inorganic binding material to bind zeolite particles which become aggregates, a predetermined amount of the inorganic binding material containing at least basic aluminum chloride is used, and the zeolite structure satisfies a relation of $P2/P1 \leq 1.0$, in which P2 is a ratio of volumes of pores having pore diameters of 0.003 to 0.03 μm with respect to the whole pore volume of the zeolite structure and P1 is a ratio of a volume of the inorganic binding material in the zeolite structure with respect to a volume of the zeolite structure. That is, the zeolite structure of the present invention is provided with a dense binding portion by the inorganic binding material, and a mechanical strength, for example, a bending strength of the zeolite structure constituted of a porous article manufactured by extrusion forming is remarkably high.

Furthermore, in a manufacturing method of the zeolite structure of the present invention, dense binding by the inorganic binding material is realized, and it is possible to easily and inexpensively manufacture the zeolite structure of the present invention having an excellent mechanical strength.

DETAILED DESCRIPTION OF THE INVENTION

Next, a configuration for carrying out the present invention will be described in detail with reference to the drawings, but it should be understood that the present invention is not limited to the following embodiment, and design modification, improvement and the like are appropriately added to the present invention based on knowledge of a person with ordinary skill without departing from the scope of the present invention.

Figure 1:
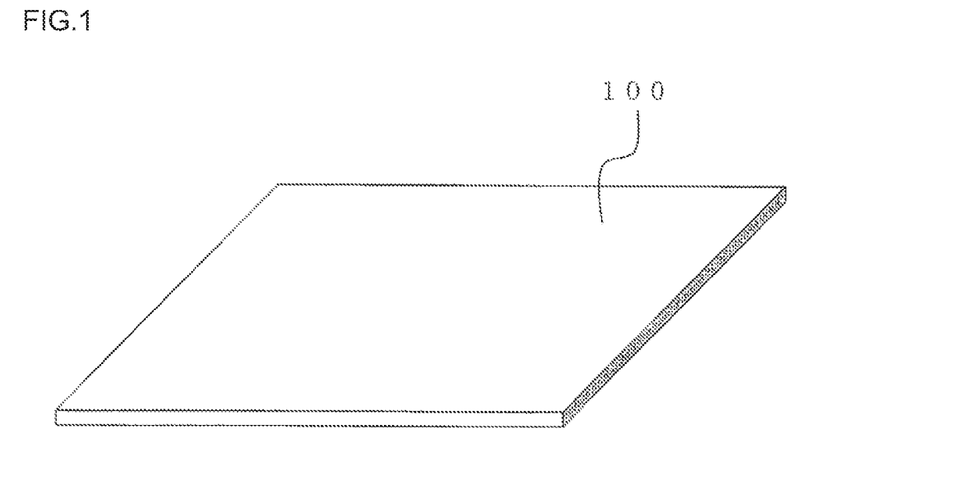
FIG. 1 is a perspective view schematically showing one embodiment of a zeolite structure of the present invention.

(1) Zeolite Structure:

As shown in FIG. 1, an embodiment of a zeolite structure of the present invention is a porous zeolite structure 100 constituted of a formed article obtained by extruding a zeolite raw material containing a plurality of zeolite particles and an inorganic binding material including at least basic aluminum chloride. Here, FIG. 1 is a perspective view schematically showing the embodiment of the zeolite structure of the present invention, and FIG. 2 is an enlarged view schematically showing a binding state of the zeolite particles and the inorganic binding material in a section of the zeolite structure of FIG. 1 which is vertical to the surface thereof.

Figure 2:
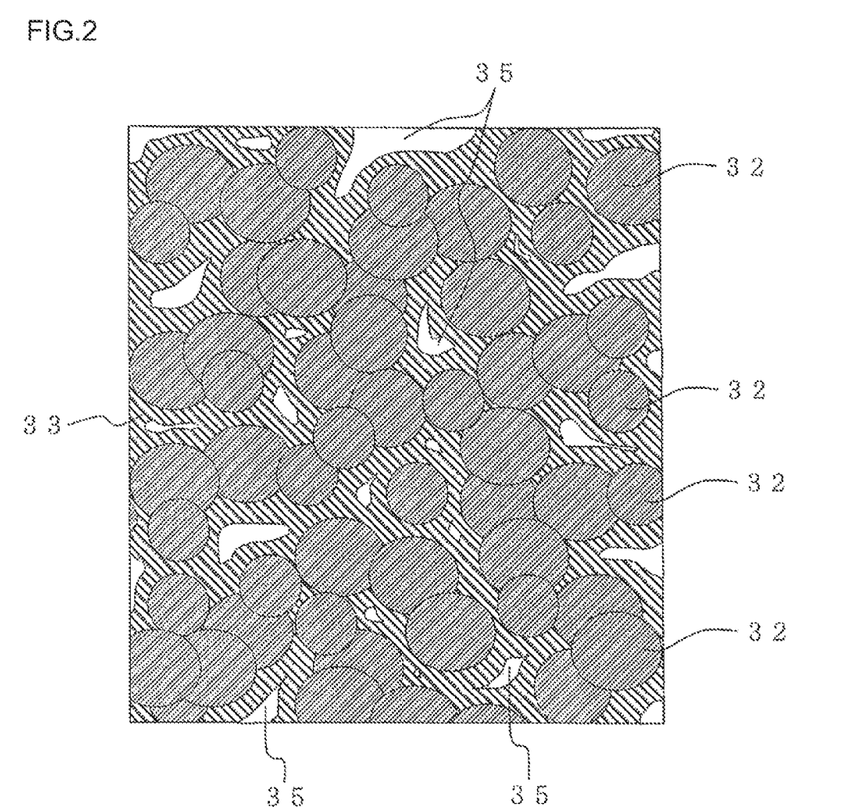
FIG. 2 is an enlarged view schematically showing a binding state of zeolite particles and an inorganic binding material in a section of the zeolite structure of FIG. 1 which is vertical to the surface thereof.

As shown in FIG. 2, the porous zeolite structure 100 is constituted of a porous article in which zeolite particles 32 bind to one another with an inorganic binding material 33. Specifically, the structure is constituted of the porous article manufactured through drying and firing steps and the like of a formed article (a formed zeolite article) obtained by extruding the above predetermined zeolite raw material. It is to be noted that reference numerals 35 of FIG. 2 are pores (i.e., void portions) in the porous article.

Moreover, in the zeolite structure of the present embodiment, a ratio P1 ($P1 = V2/V1 \times 100$) of a volume V2 of the inorganic binding material in the zeolite structure with respect to a volume V1 of the zeolite structure is from 10 to 50 vol %. That is, in the porous article manufactured through the drying and firing steps and the like (i.e., the fired article), the volume ratio P1 of the inorganic binding material in the whole structure is from 10 to 50 vol %. It is to be noted that hereinafter, the ratio P1 will be referred to as "the inorganic binding material ratio P1".

Furthermore, the zeolite structure of the present embodiment satisfies a relation of the following equation (1), in which P1 is "the above inorganic binding material ratio" and P2 is a ratio ($P2 = Vb/Va \times 100$) of volumes Vb of pores having pore diameters of 0.003 to 0.03 μm with respect to the whole pore volume Va of the zeolite structure. It is to be noted that the above ratio P2 will be referred to as "the fine pore ratio P2" sometimes.

$$P2/P1 \leq 1.0 \qquad (1)$$

According to such a constitution, in the zeolite structure of the present embodiment, dense binding by the inorganic binding material is realized, and the porous zeolite structure constituted of a formed article obtained by extruding the zeolite raw material containing the inorganic binding material including at least basic aluminum chloride has a remarkably high mechanical strength, for example, a remarkably high bending strength.

More specifically, basic aluminum chloride is a water-soluble substance, and is, accordingly, present as an aqueous solution in the zeolite raw material. In basic aluminum chloride having such an aqueous solution state (basic aluminum chloride aqueous solution), as compared with a particulate inorganic binding material such as each type of sol or boehmite which has heretofore been used as the inorganic binding material, the aqueous solution dries to bind the zeolite particles. Therefore, a binding portion which binds the zeolite particles becomes denser.

In consequence, as to the porous article manufactured through the drying and firing steps, the average pore diameter of gaps formed by the inorganic binding material, i.e., fine pores (also simply referred to as the pores) formed in the porous article increases, whereby the above relation of equation (1) is satisfied, in which P2 is a ratio (i.e., the fine pore ratio P2) of the volumes Vb of pores having pore diameters of 0.003 to 0.03 μm with respect to the whole pore volume Va of the zeolite structure, and P1 is the above inorganic binding material ratio. Moreover, the inorganic binding material itself binds the respective particles more densely, and hence a binding portion by the inorganic binding material becomes thick, whereby the mechanical strength, for example, the bending strength of the zeolite structure constituted of the porous article becomes remarkably high.

It is to be noted that when the inorganic binding material ratio P1 is calculated, "the volume V1 (the true volume) of the zeolite structure" is a value obtained by the following equation (2).

$$V1 = Vz + V2 \quad (2),$$

V1: the volume of the zeolite structure (the true volume);
Vz: the volumes of the zeolite particles; and
V2: the volume of the (fired) inorganic binding material.

The volumes Vz of the zeolite particles and the volume V2 of the (fired) inorganic binding material can be calculated, for example, from a fine structure photograph of a section of the zeolite structure cut along a predetermined portion. More specifically, in a calculation method of the above volume, for example, the zeolite structure is first cut, and a cut section of the structure is polished. Next, the polished cut section is photographed with a scanning type electron microscope or the like. It is to be noted that when the fine structure of the section is photographed, a field of view preferably includes 10 to 30 zeolite particles.

As to the obtained scanning type electron microscope photograph (hereinafter referred to as "the SEM photograph" sometimes), image analysis software (e.g., "Image-Pro Plus (trade name)" manufactured by MEDIA CYBERNETICS Co.) is used, and the zeolite particles and the inorganic binding material are classified to measure particle diameters or occupied area of the zeolite particles, and the occupied area of the inorganic binding material. When the particle diameters of the zeolite particles are measured, an average value of the diameters in at least ten fields of view (i.e., corresponding to ten SEM photographs) is obtained.

Furthermore, the volumes of the zeolite particles and the volume of the (fired) inorganic binding material are calculated from the diameters or occupied area of the photographed zeolite particles and the occupied area of the inorganic binding material. Therefore, in the present description, "the volumes of the zeolite particles" mean the total value of the volumes of the respective zeolite particles, i.e., the volume which does not include the gaps (voids) among the zeolite particles.

Moreover, when the masses of the zeolite particles and inorganic binding material to be used in a raw material stage (i.e., a manufacturing stage) are beforehand known, or when the volume of each raw material component can be measured in the manufacturing stage, the inorganic binding material ratio P1 may be calculated in the raw material stage. When the inorganic binding material ratio P1 is obtained by such a method, the inorganic binding material ratio P1 is remarkably easy to obtain. Hereinafter, a method of calculating the inorganic binding material ratio P1 in the raw material stage will be described.

"Vz: the volumes of the zeolite particles" in the above equation (2) can be obtained by the following equation (3).

$$Vz = Mz/Dz \quad (3),$$

Vz: the volume of the zeolite particles;
Mz: the mass of the zeolite particles; and
Dz: the density of zeolite (1.85 g/cm$^3$).

Moreover, "V2: the volume of the (fired) inorganic binding material" in the above equation (2) can be obtained by the following equation (4). It is to be noted that in the following equation (4), "$M_{B2}$: the mass of the fired inorganic binding material" is a value obtained by the following equation (5). "$D_{B2}$: the density of the fired inorganic binding material" in the following equation (4) and "$m_B$: the mass change ratio of the inorganic binding material before/after firing" in the following equation (5) are values beforehand obtained by using and firing only the inorganic binding material.

$$V2 = M_{B2}/D_{B2} \quad (4),$$

V2: the volume of the fired inorganic binding material;
$M_{B2}$: the mass of the fired inorganic binding material; and
$D_{B2}$: the density of the fired inorganic binding material.

$$M_{B2} = M_{B1} \times m_B \quad (5),$$

$M_{B2}$: the mass of the fired inorganic binding material;
$M_{B1}$: the mass of the inorganic binding material before fired; and
$m_B$: the mass change ratio of the inorganic binding material before/after fired.

Moreover, when the fine pore ratio P2 is calculated, "the whole pore volume Va of the zeolite structure" is the pore volume (cc/g) per unit mass of the pores having pore diameters of 0.003 to 180 μm, and "the volume Vb of the pores having pore diameters of 0.003 to 0.03 μm" is the pore volume (cc/g) per unit mass of the pores having pore diameters of 0.003 to 0.03 μm.

It is to be noted that the above "whole pore volume Va of the zeolite structure" and "the volume Vb of the pores having the pore diameters of 0.003 to 0.03 μm" are values measured by mercury porosimetry. It is to be noted that the pore volume can be measured with a fully automatic multifunctional mercury porosimeter "PoreMaster 60GT (trade name)" manufactured by Quantachrome Co.

It is to be noted that if the inorganic binding material ratio P1 is less than 10 vol %, the amount of the inorganic binding material is excessively small, it becomes difficult to satisfactorily bind the zeolite particles to one another, and the mechanical strength of the zeolite structure remarkably lowers. On the other hand, if the inorganic binding material ratio P1 exceeds 50 vol %, the amount of the inorganic binding material is excessively large, and the relative ratio of the zeolite particles lowers. In consequence, zeolite functionality such as purification performance for purifying an NOx gas or the like or adsorption performance for adsorbing hydrocarbons or the like remarkably lowers.

Moreover, in the zeolite structure of the present embodiment, the value (i.e., "P2/P1") of the ratio of "the fine pore ratio P2" with respect to "the inorganic binding material ratio P1" needs to be 1 or less. That is, "the inorganic binding material ratio P1" and "the fine pore ratio P2" need to satisfy the relation of the above equation (1). If the value P2/P1 exceeds 1, the fine pore ratio P2 becomes excessively large with respect to the inorganic binding material ratio P1, whereby the mechanical strength, for example, the bending strength of the zeolite structure lowers sometimes. It is to be noted that the mechanical strength of the zeolite structure also changes in accordance with the zeolite amount in the zeolite structure (i.e., the amount of the zeolite particles). Therefore, if "the fine pore ratio P2" is only determined, an effect of improving the mechanical strength of the zeolite structure is not necessarily developed. In the zeolite structure of the present embodiment, when the value (i.e., "P2/P1") of the ratio of "the fine pore ratio P2" with respect to "the inorganic binding material ratio P1" is defined, the zeolite structure having a small fine pore volume in a specific zeolite amount can be obtained. In consequence, the zeolite structure has an excellent mechanical strength.

(1-1) Zeolite Particles:

The zeolite particles become aggregates of the zeolite structure of the present embodiment. As to such zeolite particle, the inorganic binding material binds the zeolite particles to one another, thereby forming one structure.

There is not any special restriction on the zeolite particles which are used in the zeolite structure of the present embodiment, and particles made of heretofore known zeolite can be used. There is not any special restriction on the type of zeolite or the like, but zeolite particles of at least a part of a plurality of particles are preferably particles made of at least one type of zeolite selected from the group consisting of ZSM-5 type zeolite, β-type zeolite, Y-type zeolite, mordenite type zeolite and ferrierite type zeolite. Among these type of zeolite, ZSM-5 type zeolite and β-type zeolite are preferable, because such type of zeolite has satisfactory purification performance and adsorption performance. The zeolite particles may be particles made of one type of zeolite among the above types of zeolite, or a mixture of a plurality of types of zeolite particles.

There is not any special restriction on the size of the zeolite particles, but the average particle diameter is preferably from 0.1 to 100 μm, further preferably from 0.5 to 50 μm and especially preferably from 0.7 to 20 μm. If the average particle diameter of the zeolite particles is less than 0.1 μm, heat resistance lowers sometimes. If the average particle diameter exceeds 100 μm, the zeolite particles are excessively large during the extrusion of the zeolite raw material containing the zeolite particles, whereby it may become difficult to extrusion-form the zeolite structure.

It is to be noted that the average particle diameter of the zeolite particles can be obtained by measuring the particle diameters of the zeolite particles from an SEM photograph which is used for calculation of the above volumes of the zeolite particles (i.e., the calculation of the inorganic binding material ratio P1) by use of the above image analysis software to obtain the particle size distribution of the zeolite particles. It is to be noted that during the measurement of the particle diameters by the above image analysis software, the diameters of round particles can be measured as the particle diameters of the particles. Moreover, when the particle diameters of the zeolite particles are measured, an average value of the diameters in at least ten fields of view (i.e., corresponding to ten SEM photographs) is obtained.

Moreover, when the average particle diameter of the zeolite particles which are used in a raw material stage (i.e., a manufacturing stage) are possible to be measured, the average particle diameter of the zeolite particles can be measured in this raw material stage. When the average particle diameter of the zeolite particles is obtained by such a method, the average particle diameter can remarkably easily be obtained. "The average particle diameter" in the present embodiment is a median diameter (d50) in the particle diameter distribution of particles (e.g., zeolite particles). It is to be noted that the average particle diameter is a value measured by a laser diffraction scattering process in conformity to JIS R1629. The average particle diameter of the zeolite particles can be measured with a laser diffraction/scattering type particle size distribution measuring device: "LA-920 (trade name)" manufactured by Horiba, Ltd.

Moreover, the zeolite structure of the present embodiment is preferably made of zeolite (zeolite particles) subjected to ion exchange between cations of zeolite and metal ions. Such zeolite subjected to the ion exchange between cations of zeolite and the metal ions has an excellent catalyst function, and a treatment such as removal of nitrogen oxides (NOx) from an exhaust gas can satisfactorily be performed.

Specifically, the zeolite particles of at least a part of the plurality of zeolite particles are preferably particles made of zeolite subjected to ion exchange between cations of zeolite and ions of at least one type of metal selected from the group consisting of copper, iron, nickel, zinc, manganese, cobalt, silver, palladium, indium, cerium, gallium, titanium and vanadium. For example, ion exchange between cations of zeolite and the iron ions or copper ions can obtain a satisfactory NOx gas purification performance, or ion exchange between cations of zeolite and the copper ions or silver ions can develop a satisfactory hydrocarbon adsorption ability.

It is to be noted that there is not any special restriction on an ion exchange amount between cations of zeolite and the metal ions (M+/Al ion molar ratio), but the ion exchange amount is preferably from 0.3 to 2.0, further preferably from 0.7 to 1.5 and especially preferably from 0.9 to 1.2. It is to be noted that the ion exchange amount can be measured with, for example, an inductively coupled plasma mass analysis device: "SPQ9000 (trade name)" manufactured by Seiko Instruments, Inc. It is to be noted that the above ion exchange amount is a molar ratio ("M+/Al ions") of a metal ion valence (M+) with respect to aluminum ions (Al ions) in zeolite. It is to be noted that if the ion exchange amount is small (e.g., less than 0.3), a catalyst performance lowers. On the other hand, if the ion exchange amount is excessively large (e.g., exceeding 2.0), the catalyst performance is saturated, and the effect due to the ion exchange is not easily developed sometimes. It is to be noted that the ion exchange amount can be represented by the ratio (mass %) of the mass of the metal ions with respect to the mass of the zeolite particles subjected to the exchange.

It is to be noted that when the zeolite particles are subjected to the ion exchange, zeolite having a powder material state before binding with the binding material may be subjected to the ion exchange, or zeolite having a zeolite structure state after binding with the binding material may be subjected to the ion exchange. It is to be noted that because of simpler manufacturing steps, zeolite having the powder material state is more preferably subjected to the ion exchange (i.e., zeolite having a raw material state and beforehand subjected to the ion exchange).

(1-2) Inorganic Binding Material:

The inorganic binding material is a binding material which binds the above-mentioned zeolite particles, which are aggregates, to one another.

In the zeolite structure of the present embodiment, as described above, a ratio P1 (P1 =V2/V1×100) of a volume V2 of the inorganic binding material in the zeolite structure with respect to a volume V1 of the zeolite structure is from 10 to 50 vol %. Furthermore, as the inorganic binding material which is used during the preparation of the zeolite raw material (the inorganic binding material before dried and fired), an inorganic binding material including at least basic aluminum chloride is used. It is to be noted that basic aluminum chloride as the inorganic binding material which is used during the preparation of the zeolite raw material is present as the inorganic binding material having the state of aluminum oxide in the porous article (the zeolite structure), when the extrusion-formed article is fired.

Basic aluminum chloride is a water-soluble substance, and is, accordingly, present as the inorganic binding material having the state of an aqueous solution in the zeolite raw material. Basic aluminum chloride (the aqueous basic aluminum chloride solution) having such a state of aqueous solution has heretofore been used as the inorganic binding material. Unlike a particulate inorganic binding material such as each type of sol or boehmite, the aqueous solution dries to bind the zeolite particles, whereby a binding portion which binds the zeolite particles become denser. In consequence, the binding portion by the inorganic binding material becomes thick (i.e., the binding portion becomes dense), and the amount of pores having comparatively small pore diameters (specifically, the pores having pore diameters of 0.003 to 0.03%) becomes small, whereby the mechanical strength, for example, the bending strength of the zeolite structure constituted of the porous article becomes remarkably high.

It is to be noted that the ratio P1 of the volume V2 of the inorganic binding material in the zeolite structure with respect to the volume V1 of the zeolite structure is from 10 to 50 vol %, preferably from 10 to 30 vol %, and further preferably from 15 to 25 vol %. According to such a constitution, both improvement of the mechanical strength and improvement of functionality of zeolite can be achieved with good balance. That is, if the inorganic binding material ratio P1 is less than 10 vol %, the mechanical strength of the zeolite structure lowers sometimes. If the ratio exceeds 50 vol %, the amount of the inorganic binding material becomes large, and the functionality of the zeolite lowers sometimes.

It is to be noted that the inorganic binding material contained in the zeolite raw material preferably includes basic aluminum chloride having an amount which is from 10 to 30 mass %, further preferably from 15 to 30 mass %, and especially preferably from 20 to 30 mass % in terms of a solid content with respect to 100 mass % of the zeolite particles. According to such a constitution, the amount of basic aluminum chloride which forms the dense binding portion can sufficiently be acquired, and the mechanical strength of the zeolite structure can satisfactorily improve. Moreover, when such an amount of basic aluminum chloride is included, the value of the ratio of "the fine pore ratio P2" with respect to the above "inorganic binding material ratio P1" can be set to be 1 or less (i.e., satisfy the relation of the above equation (1)). It is to be noted that if the amount of basic aluminum chloride is less than 10 mass % in terms of the solid content with respect to 100 mass % of the zeolite particles, the mechanical strength of the zeolite structure cannot sufficiently improve. If the amount exceeds 30 mass %, the function of the organic binder contained in the zeolite raw material is disturbed, and water retention properties lower, whereby it may become difficult to extrude the zeolite raw material.

It is to be noted that the above "in terms of the solid content" means a residual content excluding a component which is present as a liquid at ordinary temperature (20° C.). That is, "the mass in terms of the solid content" is the mass corresponding to the solid content of the inorganic binding material included in a solution such as the aqueous solution which is the inorganic binding material. For example, the mass of basic aluminum chloride is a mass $[Al_2(OH)_n Cl_{6-n}]_m$ (with the proviso that $0<n<6$, and $1 \leq m \leq 10$). For example, when basic aluminum chloride is the aqueous solution, the mass in terms of the solid content is the mass of the dried article (the solid content) in a case where the article is dried at 120° C. in the atmospheric air for 24 hours.

The inorganic binding material contained in the zeolite raw material may further include another inorganic binding material in addition to basic aluminum chloride described above. Examples of this inorganic binding material include at least one type selected from the group consisting of alumina sol, silica sol, titania sol, zirconia sol, ceria sol, boehmite, montmorillonite, hydrotalcite, hydraulic alumina, silicon resin, and water glass.

(1-3) Zeolite Raw Material:

The zeolite raw material is a raw material for obtaining the formed article to form the zeolite structure of the present embodiment, and contains the zeolite particles and the inorganic binding material as described above.

It is to be noted that the zeolite raw material preferably contains water. The content of water in the zeolite raw material is preferably from 30 to 70 mass % with respect to 100 mass % of the zeolite particles.

Moreover, the zeolite raw material may contain an organic binder, and may further contain a dispersant and the like. Examples of the organic binder include hydroxypropyl methylcellulose, hydroxyethyl methylcellulose, methylcellulose, hydroxyethyl cellulose, carboxymethylcellulose, and polyvinyl alcohol. It is to be noted that in the zeolite structure of the present embodiment, hydroxypropyl methylcellulose or hydroxyethyl methylcellulose can preferably be used. Such an organic binder has a high compatibility with the aqueous basic aluminum chloride solution, whereby the function of the organic binder is not easily disturbed. Therefore, the water retention properties of the zeolite raw material can satisfactorily be kept. Examples of the dispersant include fatty acid, acrylic acid, sorbitan acid, dextrin and polyalcohol.

(1-4) Zeolite Structure:

The zeolite structure of the present embodiment is constituted of a formed article obtained by extruding a zeolite raw material containing the zeolite particles and the inorganic binding material as described above, and is a porous article formed by binding the zeolite particles with the inorganic binding material. More specifically, the zeolite structure is constituted of a fired article obtained by firing the above formed article.

It is to be noted that the porosity and pore diameters (fine pore diameters) of the zeolite structure of the present embodiment need to be considered from two viewpoints. In the first viewpoint, zeolite (the zeolite particles) is a substance having fine pores as a crystal structure. Therefore, the first viewpoint relates to fine pores having a value inherent in the type of zeolite. The value is determined, when the type of zeolite is determined. For example, ZSM-5 type zeolite has fine pores of oxygen ten-membered rings, and fine pore diameters are from about 0.5 to 0.6 nm. Moreover, β-type zeolite has fine pores of oxygen twelve-membered rings, and fine pore diameters are from about 0.5 to 0.75 nm. In the second viewpoint, the zeolite structure includes the zeolite particles (zeolite crystal particles) integrated with the binding material, and hence the second viewpoint relates to the porosity and pore diameters of the zeolite structure (the porous article).

In the zeolite structure of the present embodiment, the porosity is preferably from 20 to 60%, further preferably from 30 to 50%, and especially preferably from 30 to 40%. It is to be noted that the porosity is a value calculated by the following equation (6) by use of a pore volume per unit mass of pores having pore diameters of 0.003 to 180 μm measured by mercury porosimetry, and density of the zeolite structure.

$$\text{Porosity} = [\text{density of zeolite structure}]/[\text{density of zeolite structure} + 1/\text{pore volume}] \times 100 \qquad (6)$$

It is to be noted that the pore volume was measured with a fully automatic multifunctional mercury porosimeter "PoreMaster 60GT (trade name)" manufactured by Quantachrome Co. Moreover, as to the density of the zeolite structure, the density of the zeolite particles was set to 1.85 g/cm$^3$, and the density of the fired inorganic binding material was measured with a dry type automatic densimeter "Accupyc 1330 (trade name)" manufactured by Micromeritics, Inc. The density of the zeolite structure was calculated by dividing the total value of the mass of the zeolite particles and the mass of the fired inorganic binding material by the total value of the volume of the zeolite particles and the volume of the fired inorganic binding material.

It is to be noted that in the zeolite structure of the present embodiment, as described above, the inorganic binding material ratio P1 and the fine pore ratio P2 satisfy the relation of the above equation (1), but the lower limit value of the value (P2/P1) of the ratio of the fine pore ratio P2 with respect to the inorganic binding material ratio P1 is, for example, 0.01 in a manufacturable range. It is to be noted that there is not any special restriction on the above value of the ratio (P2/P1). However the ratio is preferably from 0.01 to 0.7, and further preferably from 0.01 to 0.5. According to such a constitution, the mechanical strength of the zeolite structure can further improve.

Figure 3:
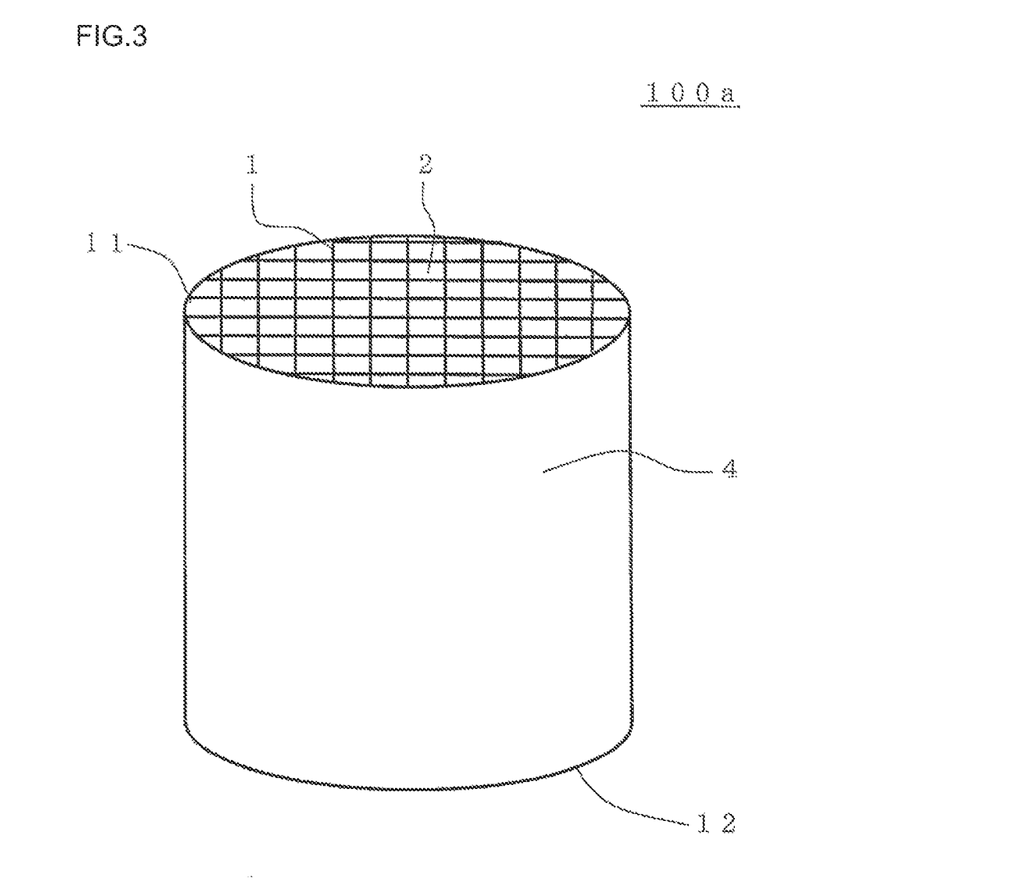
FIG. 3 is a perspective view schematically showing another embodiment of the zeolite structure of the present invention.

There is not any special restriction on the shape of the zeolite structure, as long as the structure is formed by extrusion and can be utilized for gas purification or separation. For example, the zeolite structure may have a shape such as a film-like shape, a plate-like shape (e.g., see FIG. 1) or a tubular shape. As shown in FIG. 3, the zeolite structure may be formed in a honeycomb shape including partition walls 1 disposed to form a plurality of cells 2 which become through channels of a fluid and which extend from one end face 11 to the other end face 12 (a zeolite structure 100a). Here, FIG. 3 is a perspective view schematically showing another embodiment of the zeolite structure of the present invention.

According to such a honeycomb shape, it is possible to form, by the zeolite structure, a honeycomb structure for purifying an exhaust gas discharged from an engine for a car, an engine for a construction machine, an industrial stational engine, a burning apparatus or the like and containing NOx or the like, or for adsorbing hydrocarbons or the like. That is, it is not necessary to use a ceramic carrier of cordierite or the like, which has heretofore been used. Therefore, unlike a case where the ceramic carrier is used, a pressure loss can remarkably be low. Therefore, more catalysts can be loaded on the zeolite structure. Moreover, the zeolite structure of the present embodiment has a remarkably high strength. Therefore, even when the zeolite structure is installed and used in an exhaust system of a car, breakdown or deformation due to vibration or the like does not easily occur.

Moreover, when the zeolite structure is formed in the honeycomb shape, an area of a section which is perpendicular to an extending direction of the cells 2 is preferably from 300 to 200000 mm$^2$. If the area is smaller than 300 mm$^2$, an area where the exhaust gas can be treated becomes small sometimes. Additionally, the pressure loss increases sometimes. If the area is larger than 200000 mm$^2$, the strength of the zeolite structure lowers sometimes.

Furthermore, as shown in FIG. 3, the zeolite structure 100a of the present embodiment preferably comprises an outer peripheral wall 4 disposed to surround the whole outer periphery of the partition walls 1. The material of the outer peripheral wall does not necessarily have to be the same material as that of the partition walls. However, if the material of an outer peripheral portion is noticeably different in the viewpoints of physical properties such as heat resistance and thermal expansion coefficient, a problem of breakdown of the partition walls or the like occurs sometimes. Therefore, the outer peripheral wall and the partition walls mainly preferably include the same material or contain a material having the equivalent physical properties. The outer peripheral wall may be formed integrally with the partition walls by extrusion, or the outer peripheral portion of a formed article may be processed in a desirable shape and coated with the outer peripheral wall.

In the zeolite structure having the honeycomb shape, there is not any special restriction on the shape of each cell (i.e., the shape of the section of each cell which is perpendicular to a cell extending direction), and examples of the shape include a triangular shape, a quadrangular shape, a hexagonal shape, an octagonal shape, a round shape, and a combination of these shapes.

The thicknesses of the partition walls in the zeolite structure having the honeycomb shape are preferably from 50 μm to 2 mm, and further preferably from 100 μm to 350 μm. If the thicknesses are smaller than 50 μm, the strength of the zeolite structure lowers sometimes. If the thicknesses are larger than 2 mm, the purification performance lowers sometimes, or the pressure loss increases sometimes when the gas passes through the zeolite structure. Moreover, the thickness of the outer peripheral wall 4 of the outermost periphery of the zeolite structure having the honeycomb shape is preferably 10 mm or less. If the thickness is larger than 10 mm, an area to perform an exhaust gas purification treatment may become small.

Moreover, there is not any special restriction on the cell density of the zeolite structure having the honeycomb shape, but the cell density is preferably from 7.8 to 155.0 cells/cm$^2$, and further preferably from 31.0 to 93.0 cells/cm$^2$. If the cell density is larger than 155.0 cells/cm$^2$, the pressure loss increases sometimes when the gas passes through the zeolite structure. If the cell density is smaller than 7.8 cells/cm$^2$, the area to perform the exhaust gas purification treatment becomes small sometimes.

There is not any special restriction on the whole shape of the zeolite structure having the honeycomb shape, and examples of the shape include a cylindrical shape, an oval shape and another desirable shape. As to the size of the zeolite structure, when the zeolite structure has, for example, a cylindrical shape, the diameter of the bottom surface of the structure is preferably from 20 to 500 mm, and further preferably from 70 to 300 mm. Moreover, the length of the zeolite structure in a central axis direction is preferably from 10 to 500 mm, and further preferably from 30 to 300 mm.

(2) Manufacturing Method of Zeolite Structure:

Next, one embodiment of a manufacturing method of the zeolite structure of the present invention will be described. The embodiment of the manufacturing method of the zeolite structure of the present invention manufactures one embodiment of the above zeolite structure of the present invention.

The manufacturing method of the zeolite structure of the present embodiment comprises a step of mixing a plurality of zeolite particles, an inorganic binding material which binds the zeolite particles to one another, and an organic binder, to prepare a zeolite raw material (hereinafter referred to as "the zeolite raw material preparation step" sometimes); a step of extruding the obtained zeolite raw material to obtain a formed zeolite article (hereinafter referred to as "the extrusion forming step" sometimes); and a step of firing the obtained formed zeolite article to prepare the zeolite structure (hereinafter referred to as "the firing step" sometimes).

Furthermore, in the manufacturing method of the zeolite structure of the present embodiment, the inorganic binding material containing basic aluminum chloride having an amount which is from 10 to 30 mass % in terms of a solid content with respect to 100 mass % of the zeolite particles is added so that the volume ratio of the inorganic binding material included in the zeolite structure with respect to the volume of the zeolite structure obtained by firing the article is from 10 to 50 vol %, whereby the zeolite raw material is prepared.

According to such a constitution, the zeolite structure of the present embodiment described above can simply and inexpensively be manufactured. It is to be noted that there is not any special restriction on the shape of the formed zeolite article obtained by the extrusion, and the shape may be a plate-like shape of the zeolite structure 100 shown in FIG. 1, or a honeycomb shape of the zeolite structure 100*a* shown in FIG. 3.

Hereinafter, the manufacturing method of the zeolite structure of the present embodiment will be described in more detail.

(2-1) Zeolite Raw Material Preparation Step:

First, in the manufacturing method of the zeolite structure of the present embodiment, plurality of zeolite particles, the inorganic binding material which binds the zeolite particles to one another, and the organic binder are mixed to prepare the zeolite raw material. In this case, as described above, the inorganic binding material containing "basic aluminum chloride having an amount which is from 10 to 30 mass % in terms of a solid content with respect to 100 mass % of the zeolite particles" is prepared as the inorganic binding material, and added so that the volume ratio of the inorganic binding material included in the zeolite structure (i.e. the volume ratio of the fired inorganic binding material) with respect to the volume of the zeolite structure obtained by firing the article (i.e., the volume of the fired zeolite structure) is from 10 to 50 vol %. It is to be noted that the volume of the fired zeolite structure and the volume of the fired inorganic binding material can be calculated by the above equations (2) to (5). For example, the only inorganic binding material to be used is fired to obtain a mass change ratio before and after firing the inorganic binding material, whereby the amount of the inorganic binding material which is used in the zeolite raw material (the mass or the volume calculated from the mass) is preferably determined.

As the zeolite particles, there can be used particles made of at least one type of zeolite selected from the group consisting of ZSM-5 type zeolite, β-type zeolite, Y-type zeolite, mordenite type zeolite and ferrierite type zeolite. It is to be noted that these zeolite particles preferably have a constitution similar to that described in the embodiment of the zeolite structure of the present invention.

Moreover, the zeolite particles may be subjected to an ion exchange treatment between the cations of particles and metal ions. When such zeolite particles are used, a zeolite structure having an excellent catalyst function can easily be manufactured. It is to be noted that the ion exchange treatment can be performed after manufacturing the zeolite structure.

It is to be noted that a method of subjecting the zeolite particles or the zeolite structure to the ion exchange treatment between cations of zeolite and the metal ions can be performed as follows.

A solution for ion exchange containing metal ions for the ion exchange (the solution containing the metal ions) is prepared. For example, when the ion exchange is performed by using silver ions, an aqueous solution of silver nitrate or silver acetate is prepared. Moreover, when the ion exchange is performed by using copper ions, an aqueous solution of copper acetate, copper sulfate or copper nitrate is prepared. Furthermore, when the ion exchange is performed by using iron ions, an aqueous solution of iron sulfate or iron acetate is prepared. The concentration of the solution for ion exchange is preferably from 0.005 to 0.5 (mol/liter). Moreover, the zeolite particles are immersed in the solution for ion exchange. Immersion time can appropriately be determined in accordance with the intended amount of the metal ions for the ion exchange or the like. Furthermore, when the zeolite particles are taken out of the solution for ion exchange, dried and calcinated, the zeolite particles subjected to the ion exchange can be obtained. Drying conditions are preferably from 80 to 150° C. and from one to ten hours. Calcinating conditions are preferably from 400 to 600° C. and from one to ten hours.

Next, the inorganic binding material includes at least basic aluminum chloride, and may further include at least one type selected from the group consisting of alumina sol, silica sol, titania sol, zirconia sol, ceria sol, boehmite, montmorillonite, hydrotalcite, hydraulic alumina, silicon resin, and water glass.

It is to be noted that the amount of the inorganic binding material in the zeolite raw material is set so that the volume ratio of the inorganic binding material included in the zeolite structure with respect to the volume of the zeolite structure obtained by firing the article is from 10 to 50 vol %, preferably from 10 to 30 vol %, and further preferably from 15 to 25 vol %. According to such a constitution, both improvement of the mechanical strength of the obtained zeolite structure and improvement of the functionality of zeolite can be acquired with good balance.

Moreover, this inorganic binding material includes basic aluminum chloride having an amount which is from 10 to 30 mass % in terms of a solid content with respect to 100 mass % of the zeolite particles, whereby the amount of basic aluminum chloride which forms the dense binding portion can sufficiently be acquired, and the mechanical strength of the zeolite structure can satisfactorily improve. It is to be noted that as described above, the whole amount of the inorganic binding material to be used is calculated from the volumes of the fired zeolite structure and inorganic binding material, but the content of basic aluminum chloride is calculated by the mass of the solid content in the zeolite raw material (the mass of a dried article).

It is to be noted that when the inorganic binding material includes the above amount of basic aluminum chloride, the value (i.e., "P2/P1") of the ratio of the "the fine pore ratio P2" with respect to "the inorganic binding material ratio P1" can be set to be 1 or less. That is, it is possible to easily manufacture the zeolite structure which satisfies the above relation of the equation (1) between "the inorganic binding material ratio P1" and "the fine pore ratio P2". It is to be noted that if the mass of the solid content of basic aluminum chloride is less than 10 mass % with respect to 100 mass % of the zeolite particles, the mechanical strength of the zeolite structure cannot sufficiently improve. If the mass exceeds 30 mass %, the function of the organic binder contained in the zeolite structure is disturbed, and the water retention properties lower. Therefore, it may become difficult to extrude the zeolite raw material.

It is to be noted that basic aluminum chloride in the inorganic binding material preferably has an amount which is preferably from 15 to 30 mass % and further preferably from 20 to 30 mass % in terms of the solid content with respect to 100 mass % of the zeolite particles.

It is to be noted that basic aluminum chloride as the inorganic binding material is dissolved in water included in the zeolite raw material, and is present in the state of the aqueous solution in the zeolite raw material. Therefore, a powder-like material can be used as basic aluminum chloride, but the material having preliminary the state of the aqueous solution is preferably used so that basic aluminum chloride is not insoluble. Examples of basic aluminum chloride include "Takibine #1500 (trade name): liquid" and "Takibine #3000 (trade name): powder" manufactured by Taki Chemical Co., Ltd.

The zeolite raw material preferably contains water. The content of water in the zeolite raw material is preferably from 30 to 70 mass % with respect to 100 mass % of the zeolite particles.

Moreover, the zeolite raw material contains an organic binder. Examples of the organic binder include hydroxypropyl methylcellulose, hydroxyethyl methylcellulose, methylcellulose, hydroxyethyl cellulose, carboxymethylcellulose, and polyvinyl alcohol. In the manufacturing method of the zeolite structure of the present embodiment, hydroxypropyl methylcellulose or hydroxyethyl methylcellulose can preferably be used. Such an organic binder has a high compatibility with the aqueous basic aluminum chloride solution, whereby the function of the organic binder is not easily disturbed. The water retention properties of the zeolite raw material can satisfactorily be kept.

Furthermore, the zeolite raw material may further contain a dispersant and the like. Examples of the dispersant include fatty acid, acrylic acid, sorbitan acid, dextrin and polyalcohol.

There is not any special restriction on a method of mixing the zeolite raw material containing at least the zeolite particles, the inorganic binding material and the organic binder, and a known method can be employed. Examples of the method include a method of mixing and kneading the material by using a twin arm type kneader manufactured by Honda Machinery Works Co., Ltd. in a dry system (i.e., without adding any water) for 10 to 30 minutes, further adding water to the mixed material, and mixing and kneading the material for 20 to 60 minutes while regulating viscosity of the mixed material.

(2-2) Extrusion Forming Step:

Next, the obtained zeolite raw material is formed in a predetermined shape by extrusion, to obtain a formed zeolite article. It is to be noted that when the formed zeolite article is formed in a honeycomb shape, for example, first the zeolite raw material is preferably kneaded to obtain a columnar formed article, and the columnar formed article is formed as a formed zeolite article having the honeycomb shape by extrusion. There is not any special restriction on a method of kneading the zeolite raw material (the forming raw material) to obtain the columnar formed article, and examples of the method include methods using a kneader, a vacuum clay kneader and the like. During the extrusion forming, it is preferable to use a die having the desirable whole shape, cell shape, partition wall thickness, cell density and the like. As a material of the die, a metal which is not easily worn is preferable.

The obtained formed article having the honeycomb shape is preferably dried before fired. There is not any special restriction on a drying method, and examples of the method include electromagnetic heating systems such as microwave heating drying and high frequency inductive heating drying, and external heating systems such as hot air drying and superheated steam drying. Among these methods, there is a method of drying the article to remove a predetermined amount of water by the electromagnetic heating system and then drying the article to remove the remaining water by the external heating system, and this method is preferable in that the whole formed article can quickly and uniformly be dried so as to prevent cracks from being generated. In particular, when such drying is performed, the aqueous basic aluminum chloride solution is dried to remove water from the inorganic binding material by evaporation, whereby the inorganic binding material becomes dense.

Moreover, before firing (finally firing) the formed zeolite article, the formed zeolite article is preferably calcinated. The article is calcinated to degrease the article. There is not any special restriction on this method, as long as contained organic substances (the organic binder, the dispersant, and the like.) can be removed. As calcinating conditions, the article is preferably heated at about 200 to 500° C. in an oxidizing atmosphere for about one to 20 hours.

(2-3) Firing Step:

Next, the formed zeolite article is fired to obtain a zeolite structure having a predetermined shape. Therefore, "the fired and formed zeolite article" is "the zeolite structure". There is not any special restriction on a firing method, and the article can be fired by using an electric furnace, a gas furnace or the like. Firing conditions are preferably heating at a temperature from 500 to 750° C. in the atmosphere for one to ten hours.

When the drying and firing steps are performed in this manner and the zeolite particles bind with the inorganic binding material, a basic aluminum chloride solution (the aqueous basic aluminum chloride solution) included as the inorganic binding material dries to form a binding portion, whereby the denser binding portion can be formed. In consequence, the average pore diameter of gaps formed by the inorganic binding material, i.e., pores formed in the porous article increases, and it is possible to satisfy the relation of the above equation (1), in which P2 is a ratio of volumes Vb of pores having pore diameters of 0.003 to 0.03 μm with respect to the whole pore volume Va of the zeolite structure, and P1 is a ratio of a volume V2 of the inorganic binding material in the zeolite structure with respect to a volume V1 of the zeolite structure. Moreover, the inorganic binding material itself binds the respective particles more densely, and hence a binding portion by the inorganic binding material becomes thick, whereby the mechanical strength, for example, the bending strength of the zeolite structure constituted of the porous article becomes remarkably high. It is to be noted that the binding portion (the inorganic binding material) of basic aluminum chloride formed by drying is the binding portion made of aluminum oxide through the firing step.

Moreover, when the zeolite particles subjected to the ion exchange treatment are not used as the zeolite particles, the fired and formed zeolite article may be subjected to the ion exchange treatment between cations of zeolite and the metal ions.

EXAMPLES

Hereinafter, the present invention will further specifically be described with respect to examples, but the present invention is not limited to these examples.

Example 1

As zeolite particles, there were prepared zeolite particles made of β-type zeolite, subjected to 3 mass % ion exchange between cations of zeolite and copper ions and having an average particle diameter of 0.7 μm.

Moreover, as inorganic binding materials, there were prepared a basic aluminum chloride solution containing 32 mass % of basic aluminum chloride ("Takibine #1500 (trade name)" manufactured by Taki Chemical Co., Ltd.) and boehmite having a specific surface area of 130 m²/g.

To 3500 g of zeolite particles composed of the above β-type zeolite particles, as the inorganic binding materials, 1750 g of the above basic aluminum chloride solution (the mass of basic aluminum chloride was 560 g) and 940 g of boehmite were added as described above. The volume of the fired inorganic binding material corresponded to 16.4 vol % with respect to the volume of a zeolite structure to be obtained. Moreover, the amount of basic aluminum chloride corresponded to 16.0 mass % in terms of a solid content with respect to 100 mass % of the zeolite particles. It is to be noted that the volume of the fired inorganic binding material was beforehand obtained by individually firing the inorganic binding materials used in the present example and measuring a mass change ratio due to the firing. The mass change ratio due to the firing of the basic aluminum chloride solution was 23.5%, and the density of the fired material was 3.20 g/cm³. Moreover, boehmite had a mass change ratio of 82.2%, and a density of 3.18 g/cm³ after the firing. It is to be noted that the mass change ratio due to the firing of the zeolite particles was 0.0% (no mass change), and the density was 1.85 g/cm³.

Next, further to the above mixed material, as an organic binder, 350 g of hydroxypropyl methylcellulose (HPMC) was added. The materials were mixed by using a twin arm type kneader manufactured by Honda Machinery Works Co., Ltd. in a dry system for ten minutes, water was further added, and the material was mixed and kneaded for 40 minutes while regulating viscosity of the mixed material, thereby obtaining a kneaded substance of zeolite (a zeolite raw material). Table 1 indicates a blending prescription of the zeolite raw material.

The obtained kneaded zeolite substance was extruded with a continuous kneading vacuum extrusion forming machine manufactured by Honda Machinery Works Co., Ltd., to extrusion-form a plate-like material having a width of 25 mm and a thickness of 5 mm, thereby obtaining a formed zeolite article. The obtained formed zeolite article was dried with a hot air dryer at 80° C. for 12 hours, degreased in a firing furnace at 450° C. for five hours, and fired at 700° C. for four hours, to obtain a fired zeolite article (a zeolite structure).

It is to be noted that an average particle diameter of zeolite particles is a median diameter (d50) in a distribution of particle diameters of powder containing zeolite particles. The diameter was measured by a laser diffraction scattering process in conformity to JIS R1629.

Moreover, the specific surface area which was BET specific surface area was measured by using a flow type specific surface area measuring device: "FlowSorb-2300 (trade name)" manufactured by Micromeritics, Inc. and a sample pretreatment where a sample was held at 200° C. for ten minutes was measured. Here, the specific surface area is the surface area per unit mass indicating a value obtained by obtaining a molecule number (N) necessary for covering the surface of the sample with a monomolecular layer of a gas adsorbed in the surface of the sample, for example, by gas physical adsorption with B.E.T principle, multiplying this adsorption molecular number (N) by a molecule sectional area of the adsorbed gas to obtain the surface area of the sample, and dividing the surface area of this sample by the mass of the sample.

Furthermore, the obtained zeolite structure was subjected to a four-point bending test in conformity to JIS R1601, to measure a bending strength of the zeolite structure. Table 2 indicates the measurement result of the bending strength. Moreover, column "fine pore ratio P2" of Table 2 means a ratio P2 of volumes Vb of pores having pore diameters of 0.003 to 0.03 μm with respect to the whole pore volume Va of the zeolite structure, and column "inorganic binding material ratio P1" means a ratio P1 of a volume V2 of the inorganic binding material in the zeolite structure with respect to a volume V1 of the zeolite structure. Furthermore, column "P2/P1" means a value (P2/P1) of a ratio of the fine pore ratio P2 with respect to the inorganic binding material ratio P1. It is to be noted that the above meanings of the columns also apply to Table 4.

TABLE 1

|  | Example 1 | Example 2 | Example 3 | Example 4 | Example 5 |
|---|---|---|---|---|---|
| Zeolite particle | 3500 g | 3500 g | 3500 g | 3500 g | 3500 g |
| Basic aluminum chloride solution | 1750 g | 1150 g | 3000 g | 1150 g | 3000 g |
| (basic aluminum chloride) | (560 g) | (368 g) | (960 g) | (368 g) | (960 g) |
| Boehmite | 940 g | 1100 g | 580 g | 530 g | — |
| HPMC | 350 g | 350 g | 350 g | 350 g | 350 g |

TABLE 2

|  | Example 1 | Example 2 | Example 3 | Example 4 | Example 5 |
|---|---|---|---|---|---|
| Strength (MPa) | 5.0 | 4.5 | 5.7 | 3.2 | 5.3 |
| Fine pore ratio P2 | 10.9% | 15.0% | 7.5% | 9.1% | 3.0% |
| Inorganic binding material ratio P1 | 16.4% | 16.3% | 16.4% | 10.5% | 10.4% |
| P2/P1 | 0.66 | 0.92 | 0.46 | 0.87 | 0.29 |
| Mass ratio of basic aluminum chloride | 16.0% | 10.5% | 27.4% | 10.5% | 27.4% |

Example 2

As shown in Table 1, a zeolite structure was manufactured and a bending strength thereof was measured in the same manner as in Example 1 except that as an inorganic binding material, 1150 g of basic aluminum chloride solution (a mass of basic aluminum chloride was 368 g) and 1100 g of boehmite were added. The measurement results are shown in Table 2. It is to be noted that a volume of the fired inorganic binding material was an amount corresponding to 16.3 vol % with respect to the volume of the zeolite structure. Moreover, basic aluminum chloride had an amount corresponding to 10.5 mass % in terms of a solid content with respect to 100 mass % of the zeolite particles.

Example 3

As shown in Table 1, a zeolite structure was manufactured and a bending strength thereof was measured in the same manner as in Example 1 except that as an inorganic binding material, 3000 g of basic aluminum chloride solution (a mass of basic aluminum chloride was 960 g) and 580 g of boehmite were added. The measurement results are shown in Table 2. It is to be noted that a volume of the fired inorganic binding material was an amount corresponding to 16.4 vol % with respect to the volume of the zeolite structure. Moreover, basic aluminum chloride had an amount corresponding to 27.4 mass % in terms of a solid content with respect to 100 mass % of the zeolite particles.

Example 4

As shown in Table 1, a zeolite structure was manufactured and a bending strength thereof was measured in the same manner as in Example 1 except that as an inorganic binding material, 1150 g of basic aluminum chloride solution (a mass of basic aluminum chloride was 368 g) and 530 g of boehmite were added. The measurement results are shown in Table 2. It is to be noted that a volume of the fired inorganic binding material was an amount corresponding to 10.5 vol % with respect to the volume of the zeolite structure. Moreover, basic aluminum chloride had an amount corresponding to 10.5 mass % in terms of a solid content with respect to 100 mass % of the zeolite particles.

Example 5

As shown in Table 1, a zeolite structure was manufactured and a bending strength thereof was measured in the same manner as in Example 1 except that as an inorganic binding material, 3000 g of basic aluminum chloride solution (a mass of basic aluminum chloride was 960 g) was added. The measurement results are shown in Table 2. It is to be noted that a volume of the fired inorganic binding material was an amount corresponding to 10.4 vol % with respect to the volume of the zeolite structure. Moreover, basic aluminum chloride had an amount corresponding to 27.4 mass % in terms of a solid content with respect to 100 mass % of the zeolite particles.

Comparative Example 1

As shown in Table 3, a zeolite structure was manufactured and a bending strength thereof was measured in the same manner as in Example 1 except that as an inorganic binding material, any basic aluminum chloride solution was not used and 1440 g of boehmite was added. The measurement results are shown in Table 4. It is to be noted that a volume of the fired inorganic binding material was an amount corresponding to 16.5 vol % with respect to the volume of the zeolite structure.

Comparative Example 2

As shown in Table 3, a zeolite structure was manufactured and a bending strength thereof was measured in the same manner as in Example 1 except that as an inorganic binding material, 900 g of basic aluminum chloride solution (a mass of basic aluminum chloride was 288 g) and 1200 g of boehmite were added. The measurement results are shown in Table 4. It is to be noted that a volume of the fired inorganic binding material was an amount corresponding to 16.5 vol % with respect to the volume of the zeolite structure. Moreover, basic aluminum chloride had an amount corresponding to 8.2 mass % in terms of a solid content with respect to 100 mass % of the zeolite particles.

Comparative Example 3

As shown in Table 3, a zeolite raw material was prepared in the same manner as in Example 1 except that as an inorganic binding material, 3500 g of basic aluminum chloride solution (a mass of basic aluminum chloride was 1120 g) and 450 g of boehmite were added. However, in Comparative Example 3, the zeolite raw material had low water retention properties, and the zeolite raw material could not be extruded to prepare a formed article. It is to be noted that a volume of the fired inorganic binding material was an amount corresponding to 16.5 vol % with respect to a volume of a zeolite structure. Moreover, basic aluminum chloride had an amount corresponding to 32.0 mass % in terms of a solid content with respect to 100 mass % of the zeolite particles.

Comparative Example 4

As shown in Table 3, a zeolite structure was prepared and a bending strength thereof was measured in the same manner as in Example 1 except that as an inorganic binding material, 900 g of basic aluminum chloride solution (a mass of basic aluminum chloride was 288 g) and 600 g of boehmite were added. The measurement results are shown in Table 4. IL is to be noted that a volume of the fired inorganic binding material was an amount corresponding to 10.5 vol % with respect to the volume of the zeolite structure. Moreover, basic aluminum chloride had an amount corresponding to 8.2 mass % in terms of a solid content with respect to 100 mass % of the zeolite particles.

Comparative Example 5

As shown in Table 3, a zeolite structure was prepared and a bending strength thereof was measured in the same manner as in Example 1 except that as an inorganic binding material, 1150 g of basic aluminum chloride solution (a mass of basic aluminum chloride was 368 g) and 350 g of boehmite were added. The measurement results are shown in Table 4. It is to be noted that a volume of the fired inorganic binding material was an amount corresponding to 8.5 volt with respect to the volume of the zeolite structure. Moreover, basic aluminum chloride had an amount corresponding to 10.5 mass % in terms of a solid content with respect to 100 mass % of the zeolite particles.

TABLE 3

|  | Comp. Ex 1 | Comp. Ex 2 | Comp. Ex 3 | Comp. Ex 4 | Comp. Ex 5 |
| --- | --- | --- | --- | --- | --- |
| Zeolite particles | 3500 g | 3500 g | 3500 g | 3500 g | 3500 g |
| Basic aluminum chloride solution | — | 900 g | 3500 g | 900 g | 1150 g |
| (basic aluminum chloride) |  | (288 g) | (1120 g) | (288 g) | (368 g) |

TABLE 3-continued

|  | Comp. Ex 1 | Comp. Ex 2 | Comp. Ex 3 | Comp. Ex 4 | Comp. Ex 5 |
|---|---|---|---|---|---|
| Boehmite | 1440 g | 1200 g | 450 g | 600 g | 350 g |
| HPMC | 350 g | 350 g | 350 g | 350 g | 350 g |

TABLE 4

|  | Comp. Ex 1 | Comp. Ex 2 | Comp. Ex 3 | Comp. Ex 4 | Comp. Ex 5 |
|---|---|---|---|---|---|
| Strength (MPa) | 3.2 | 3.5 | Extrusion cannot be performed | 2.6 | 0.9 |
| Fine pore ratio P2 | 30.0% | 17.6% | — | 11.3% | 8.6% |
| Inorganic binding material ratio P1 | 16.5% | 16.5% | 16.5% | 10.5% | 8.5% |
| P2/P1 | 1.82 | 1.07 | — | 1.08 | 1.01 |
| Mass ratio of basic aluminum chloride | — | 8.2% | 32.0% | 8.2% | 10.5% |

It is seen from Table 2 and Table 4 that the zeolite structures of Examples 1 to 5 have a high bending strength. In the zeolite structure constituted of the zeolite particles and the inorganic binding material, as the amount of the inorganic binding material is large, the strength improves. On the other hand, if the amount of the inorganic binding material is excessively large, the ratio of the zeolite particles becomes small, and performance such as purification performance lowers. Here, it is seen that the zeolite structures of Examples 1 to 3 and Comparative Examples 1 to 3 contain substantially the same degree of the inorganic binding material having the inorganic binding material ratio P1 in a range of 16.3 to 16.5 vol %, but as compared with the zeolite structures of Comparative Examples 1 and 2, the zeolite structures of Examples 1 to 3 have a high bending strength. In the zeolite structures of Examples 1 to 3, in the zeolite raw material, the inorganic binding material including a predetermined amount of basic aluminum chloride is used. It is supposed that basic aluminum chloride forms a dense binding portion, to improve the bending strength. It is to be noted that in the zeolite structures of Examples 1 to 3, the value (P2/P1) of the ratio of the fine pore ratio P2 with respect to the inorganic binding material ratio P1 is 1.0 or less, and it is seen from this value that the dense binding portion is formed. In particular, when the mass ratio of basic aluminum chloride is 10 mass %, the value of "P2/P1" is 1.0 or less. It is to be noted that in Comparative Example 3, since the extrusion could not be performed, the zeolite structure could not be manufactured, whereby the value of "P2/P1" could not be calculated.

Moreover, Examples 4 and 5 and Comparative Example 4 contain substantially the same degree of the inorganic binding material having the inorganic binding material ratio P1 in a range of 10.4 to 10.5 vol %. However, Examples 4 and 5 having a value "P2/P1" of 1.0 or less have a high bending strength, whereas Comparative Example 4 having a value "P2/P1" of 1.08 has a low bending strength. Moreover, it is seen that when the inorganic binding material ratio P1 is less than 10 vol % (specifically, 8.5 vol %) as in Comparative Example 5, the bending strength of the zeolite structure noticeably lowers. It is to be noted that when the Example 4 is compared with Comparative Example 2, Comparative Example 2 has a higher bending strength. However, Example 4 and Comparative Example 2 have different inorganic binding material ratios P1 (i.e., the amount of the zeolite particles). Therefore, as described above, both the examples cannot simply be compared only by the bending strength. That is, in Comparative Example 2, as compared with Example 4, the amount of the zeolite particles is relatively small, and hence various properties such as the purification performance due to zeolite deteriorate.

A zeolite structure of the present invention can be used in an adsorbing material, a catalyst, a catalyst carrier, a gas separation film or an ion exchanger. In particular, the zeolite structure can preferably be utilized to purify an exhaust gas discharged from an engine for a car, an engine for a construction machine, an industrial stational engine, a burning apparatus or the like and containing NOx or the like.

DESCRIPTION OF REFERENCE NUMERALS

1: partition wall, 2: cell, 4: outer peripheral wall, 11: one end, 12: the other end, 32 zeolite particles, 33: inorganic binding material, 35: pore and 100 and 100a: zeolite structure.

What is claimed is:

1. A manufacturing method of a zeolite structure, comprising:
    a step of mixing zeolite particles, an inorganic binding material which binds the zeolite particles to one another, and an organic binder to prepare a zeolite raw material, the inorganic binding material including basic aluminum chloride in an amount corresponding to 10 to 30 mass % in terms of a solid content to 100 mass % of the zeolite particles;
    a step of extruding the obtained zeolite raw material to obtain a formed zeolite article; and
    a step of firing the obtained formed zeolite article to prepare the zeolite structure,
    wherein the step of preparing the zeolite raw material includes the steps of adding the inorganic binding material in an amount in accordance with a mass change ratio before and after firing the inorganic binding material so that a volume of the inorganic binding material included in the zeolite structure with respect to a volume of the zeolite structure obtained by firing the formed zeolite article is from 10 to 50 vol %.

* * * * *